Sept. 6, 1932.  C. W. SINCLAIR  1,876,354
BRAKE DRUM
Filed Jan. 8, 1932
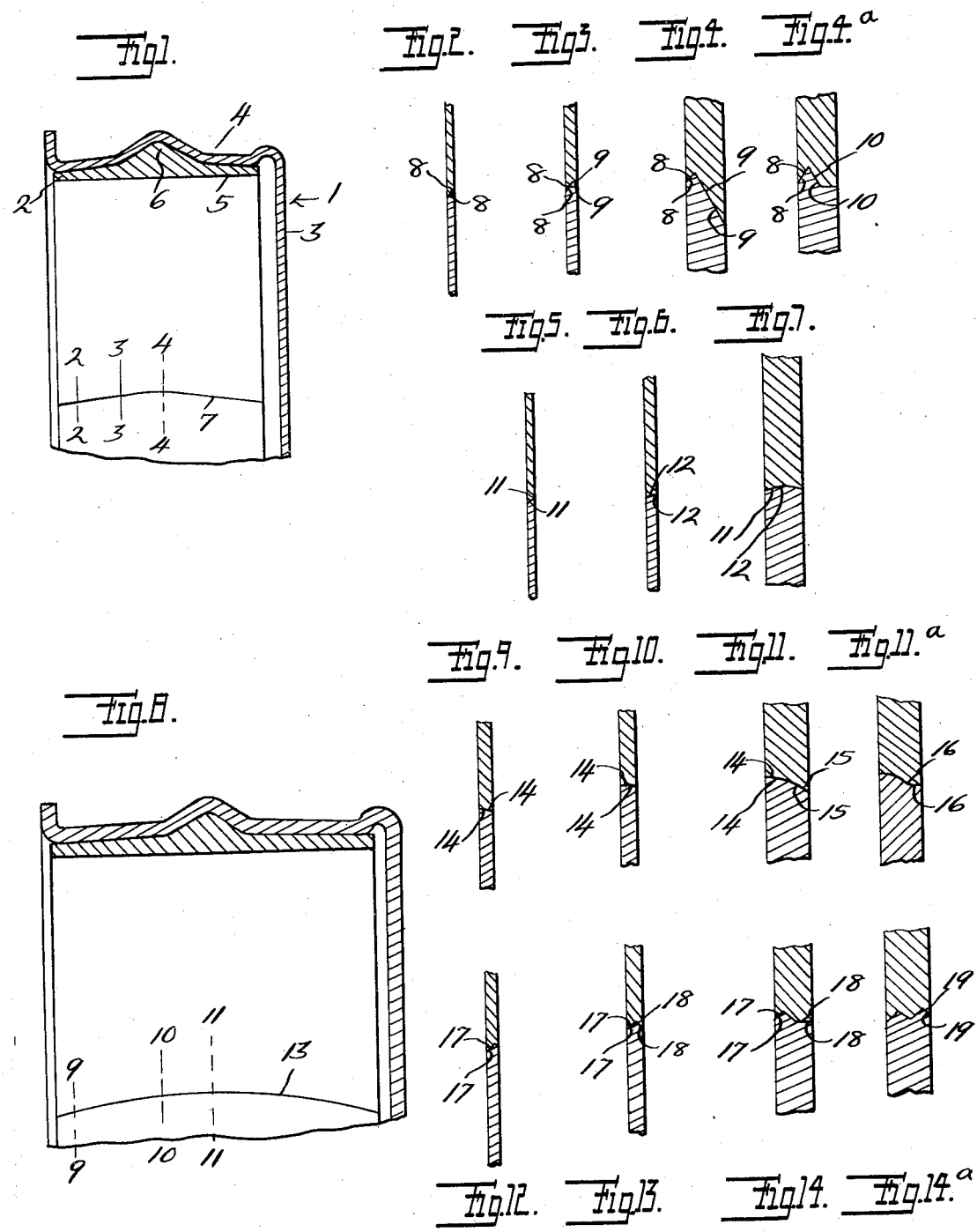
INVENTOR
Charles W. Sinclair Patented Sept. 6, 1932

1,876,354

UNITED STATES PATENT OFFICE

CHARLES W. SINCLAIR, OF DETROIT, MICHIGAN, ASSIGNOR TO KELSEY-HAYES WHEEL CORPORATION, OF DETROIT, MICHIGAN, A CORPORATION OF NEW YORK

BRAKE DRUM

Application filed January 8, 1932. Serial No. 585,567.

The invention relates to brake drums and more particularly to brake drums for use with motor vehicles. One of the objects of the invention is to provide an improved construction of brake drum having a body and a separately formed transversely split brake engaging member so arranged that the body and the member are effectively secured together and the ends of the member are effectively held in registration. Another object is to so construct the brake engaging member or lining that the forming of its ends is facilitated.

These and other objects of the invention will become apparent from the following description, taken in connection with the accompanying drawing, in which Figure 1 is a sectional elevation of a brake drum embodying my invention;

Figures 2, 3 and 4 are cross sections on the lines 2—2, 3—3 and 4—4, respectively, of Figure 1;

Figure 4ª is a modification of Figure 4;

Figures 5, 6 and 7 are views similar to Figures 2, 3 and 4, respectively, showing another modification;

Figure 8 is a view similar to Figure 1 showing another embodiment of my invention;

Figures 9, 10 and 11 are cross sections on the lines 9—9, 10—10 and 11—11, respectively, of Figure 8;

Figure 11ª is a modification of Figure 11;

Figures 12, 13 and 14 are views similar to Figures 9, 10 and 11, respectively, showing another modification;

Figure 14ª is a modification of Figure 14.

The brake drum, as shown in Figure 1, comprises the body 1 and the brake engaging member 2. The body 1 is preferably a pressed or drawn sheet metal cup-shaped drum member having the back or web 3 and the integral transverse annular flange 4. The brake engaging member 2 is in the nature of an annular lining which extends within the annular flange 4 and preferably has the radially inner cylindrical surface 5 for engagement with the friction members, such as brake shoes, of the braking mechanism. This lining has portions in its width of different thickness and, as shown, is symmetrically arranged with respect to its median plane, it having at its middle the encircling or annular circumferentially extending rib 6 integral therewith. This rib increases the rigidity of the lining and also increases its heat conducting properties, the annular flange 4 having a contour to fit the radially outer surface of the lining.

The lining is formed of material having suitable wearing qualities, such as cast iron, high carbon steel, alloy steel or the like, and it is transversely split at one point only, as designated at 7. To assemble the lining with the brake drum body, the lining is collapsed by overlapping its ends and the annular flange is expanded by heating the same. At this time the lining is inserted within the annular flange and its ends brought into registration with the lining in position such that its radially outer surface properly registers with the corresponding radially inner surface of the annular flange. The annular flange is then allowed to cool or is cooled, so that it will shrink upon the lining, the relative dimensions being such that it forces the ends of the lining into tight engagement and holds the lining under compression. The step of collapsing the lining is necessary in the event that its encircling rib is of greater height than the expansion of the annular flange. However, in the event that the encircling rib is of less height than the amount of expansion that can be secured the collapsing of the lining is not necessary.

For the purpose of holding the ends of the lining in registration both axially and radially of the lining, its ends are made to interlock both axially and radially. As shown, the ends at the opposite sides of the transverse split 7 are V-shaped with one nesting within the other, so that they present portions which overlap circumferentially of the lining and hold the lining ends in axial registration. The lining ends also have portions which overlap radially of the lining. As shown in Figures 2, 3 and 4, it will be noted that the lining ends throughout the width of the lining present the complemental zones 8 each of substantially the same contour. These zones have faces of the same extent throughout the width of the lining and arranged at a predetermined angle to a radius of the brake drum passing therethrough. Furthermore, the lining ends and more particularly the thicker portions of the lining ends including those portions formed by the encircling ribs 6 present other complemental zones 9 each of a contour different from the zones 8 and more particularly having faces at a predetermined angle to a radius of the brake drum passing therethrough other than that of the faces of the zones 8. These faces specifically converge toward the faces of the zones 8 so that when the ends of the lining are together it will be seen that they are radially interlocked and cannot separate from each other in a radial direction.

The modification shown in Figure 4ª differs from that shown in Figure 4 in that the zones 10 have, instead of a continuous face, a face with portions extending at angles to each other.

The modification shown in Figures 5, 6 and 7 differs essentially from that shown in Figures 2, 3 and 4 in that the angle of inclination of the faces of the zones 11 which extend throughout the width of the lining is less than that of the faces formed by the zones 8, but these faces are continued in the other zones 12 of the ends of the lining to a point substantially midway between the maximum distances between the radially inner and outer surfaces, after which the zones 12 have diverging faces.

In the modification shown in Figure 8 the ends of the lining have portions which circumferentially overlap, but the transverse split 13 is arcuate and, as a result, these ends are arcuate instead of being V-shaped.

Referring to Figures 9, 10 and 11, it is to be noted that the complemental zones 14 which extend throughout the width of the lining are arcuate and have a center substantially midway of the portions of the lining having a minimum thickness, as shown particularly in Figure 9. The other complemental zones 15 which are formed by the portions of greater thickness also have the same radius of curvature.

Figure 11ª discloses a modification of Figure 11 in which the zones 16 which are formed by the portions of the lining of greater thickness are reversely curved.

Figures 12, 13 and 14 disclose a modification in which the complemental zones 17 which extend throughout the width of the lining each have converging faces and the faces of the other complemental zones 18 register with one of the first mentioned faces.

As shown in Figure 14ª the zones 19 which are formed by the portions of the lining of greater thickness are Z-shaped and have intersecting faces.

With the above construction of the ends of the lining, it will be seen that by providing zones which extend throughout the width of the lining and each of which has substantially the same contour machining of the faces of these zones is facilitated. It will also be seen that the zones formed by the portions of greater thickness of the lining may also be readily machined, so that each will have substantially the same contour, but that this contour may be readily made to be different from that of the first mentioned zones. In all cases, the ends of the lining have portions which nest with each other in radially overlapping relation, so that a radial interlocking of the ends is provided. Furthermore, in all cases the ends of the lining have portions which nest with each other in circumferentially overlapping relation, so that axial interlocking is provided.

What I claim as my invention is:

1. In a brake drum, a transversely split annular lining having radially interlocking ends.

2. In a brake drum, a transversely split annular lining having axially and radially interlocking ends.

3. In a brake drum, a transversely split annular lining having portions of different thickness and radially interlocking ends with the ends throughout the width of the lining presenting zones each of substantially the same contour.

4. In a brake drum, a transversely split annular lining having portions of different thickness and radially interlocking ends with the ends throughout the width of the lining presenting zones each of substantially the same contour and with the ends of the thicker portion also presenting other zones each of a contour different from said first mentioned zones.

5. In a brake drum, a transversely split annular lining having portions of different thickness and radially interlocking ends with the ends throughout the width of the lining presenting zones having faces at an angle to a radius of the brake drum passing therethrough.

6. In a brake drum, a transversely split annular lining having portions of different thickness and radially interlocking ends with the ends throughout the width of the lining presenting zones having faces at an angle to a radius of the brake drum passing therethrough and with the ends of the thicker portion also presenting zones having faces at another angle than said first mentioned faces.

7. In a brake drum, a transversely split annular lining having portions of different thickness and radially interlocking ends with the ends throughout the width of the lining presenting zones each of substantially the same rounded contour and with the ends of the thicker portion also presenting other zones each of a rounded contour different from said first mentioned zones.

8. In a brake drum, a transversely split annular lining having ends with portions overlapping peripherally of the lining and with portions overlapping radially of the lining.

9. In a brake drum, a transversely split annular lining having radially interlocking ends and a body having a portion encircling a portion of said lining and holding the same under compression.

In testimony whereof I affix my signature.
CHARLES W. SINCLAIR.